W. C. PALMER.
RATION BALANCING CONTRIVANCE.
APPLICATION FILED FEB. 19, 1918.

1,289,246.

Patented Dec. 31, 1918.

Fig. 1

Daily rations for man doing light muscular work and
Daily rations for boy 15 to 16 years HEAT ENERGY AND FAT PRODUCING NUTRIENTS MEASURED IN CALORIES
3000 Calories PROTEIN THE BUILDING AND REPAIR NUTRIENTS
90 Grams Protein

Fig. 2

| BREAD @ 8¢ per lb. 8 oz = ½ loaf = y cost 4¢ 600 Calories | STEAK ROUND @ 25¢ per lb. 4 oz cost 6.3¢ 274 Calories | POTATOES IRISH @ 1.20¢ per lb. 1 Pound cost 2¢ 300 Calories | CHEESE AMERICAN @ 35¢ per lb. 2 oz cost 4.5¢ 250 Calories | WHOLE MILK @ 12¢ per qt. 1 lb. = 1 pt. cost 6¢ 314 Calories | ORANGE 1 large = 10 oz cost 5¢ 100 Calories | ROLLED OATS @ 7¢ per lb. 2⅔ oz = cost 1¢ 292 Calories | SUGAR @ 8¢ per lb. 2 oz = cost 1¢ 230 Calories | PRUNES @ 45¢ per lb. 3 oz = cost 8.4¢ 250 Calories | BUTTER @ 48¢ per lb. 1½ oz cost 4½¢ 300 Calories |

| BREAD 8 oz 21 Grams | STEAK ROUND 4 oz 15 Grams | POTATOES IRISH 1 Pound 8.7 Grams | CHEESE AMERICAN 2 oz 16 Grams | | | | MILK SKIM 1 lb. or 1 pt. Rich in lime 15 Grams | | ROLLED OATS 2⅔ oz 12 Grams |

WITNESSES
E. C. Wells
H. Opsahl

INVENTOR
W. C. Palmer
BY HIS ATTORNEYS
Williamson Merchant

UNITED STATES PATENT OFFICE.

WILLIAM C. PALMER, OF AGRICULTURAL COLLEGE, NORTH DAKOTA.

RATION-BALANCING CONTRIVANCE.

1,289,246.  Specification of Letters Patent.  Patented Dec. 31, 1918.

Application filed February 19, 1918. Serial No. 218,118.

*To all whom it may concern:*

Be it known that I, WILLIAM C. PALMER, a citizen of the United States, residing at Agricultural College, in the county of Cass and State of North Dakota, have invented certain new and useful Improvements in Ration-Balancing Contrivances; and I do hereby declare the following to be a full, clear, and exact description of the invention, such as will enable others skilled in the art to which it appertains to make and use the same.

My invention has for its object to provide a new contrivance for representing graphically the nutrients in definite amounts of food in relation to the daily, weekly or yearly food requirements of man (and as these requirements are affected by age, sex or occupation), or animals (and as their requirements are affected by age, work, production or purpose for which the animals are kept).

The fundamental idea of the invention is:

1. To represent the food requirement or ration by two fields, the one indicating calories, or energy, heat and fat producing nutrients, and the other indicating the protein, (the building and repair nutrients). (In animal rations the therm (1,000 calories) is used in place of calories in human rations). A more common usage, though, is to use carbo-hydrates, fat and fiber.

2. To represent the nutrients in definite amounts of each food by cards, certain of which represent calories and others represent protein. Each card represents the amounts of one class of nutrients in a definite amount of a food and are made on a scale proportionate to the respective fields with which they are used. Most foods require two cards, the one made in proportion to the calories and the other in proportion to the protein that the food portion contains. Some foods, as butter, sugar, fats and oils contain no protein and are represented by a single card, a calory card. Some fruits and vegetables contain so little protein that a card to represent it would be too small to carry the necessary data and the amount of protein is so small that it is quite negligible in the ration, for these only a calory card is used.

Foods also contain minerals and the so-called vitamins, which are essential to the body and their presence in the different food portions may be indicated on the cards, or, as they are better understood, they may be represented by another field and set of cards, but for the purpose of this case it is not thought necessary to illustrate the same.

To make up a ration, select from the cards the ones bearing the names of the foods desired and place the calory cards on the calory field, and when a food portion contains the two kinds of nutrients it will, of course, be necessary to look up the companion protein card and place the same on the protein field. The cards need not exactly cover the field for the reason that rations are not exact, but rather approximations.

To assist in the selection and assembling of the cards on the fields the calory field and cards are made the same color or design, with certain exceptions mentioned below, and the protein field and cards are made the same color or design.

To the above end, generally stated, the invention consists of the novel construction and arrangement of parts hereinafter described and defined in the claims.

In the accompanying drawings, which illustrate one use of the invention, like characters indicate like parts throughout the several views.

Referring to the drawings:

Figure 1 is a fragmentary view of a chart having indicated thereon, two fields in the form of parallel bars; and Fig. 2 is a view corresponding to Fig. 1, with the exception that the fields are covered with cards indicating a balanced daily ration for a man doing light muscular work and daily ration for a boy from fifteen to sixteen years.

The numeral 3 indicates a chart having indicated thereon a calory field 4, representing 3,000 calories, and a protein field 5, representing 90 grams of protein. These two fields, as shown, are in the form of parallel bars, and represent, in length, a daily ration for a man doing light muscular work and a daily ration for a boy from fifteen to sixteen years. The calory field 4 is made distinctive by giving the same a yellow color, and the proteins field 5 is made distinctive by giving the same a green color. Associated with the fields 4 and 5 are a number of cards, certain of which represent the calories and others of which represent the protein in definite food portions.

As previously stated, the cards represent a definite quantity of food and are made on a scale proportionate to the respective fields with which they are associated. For instance, if the calory field is 15 inches long and represent 3,000 calories, then each inch will represent $\frac{3{,}000}{15}$, or 200 calories. Thus the calory cards for half a pound of bread, which contains 600 calories, would be $\frac{600}{200}$, or 3 inches long. If the protein field is 15 inches long and represents 90 grams of protein, then each inch will represent $\frac{90}{15}$, or 6 grams of protein. The protein card for half a pound of bread, which contains 21 grams of protein, would be $\frac{21}{6}$, or 3.5 inches in length.

In selecting the portions of food to make up a ration, the respective cards are placed end to end on the respective fields, as shown in Fig. 2, until they substantially cover the same. To facilitate the selecting of the cards, the protein field is made, as shown, narrower than the calory field, and the cards have the same width as the respective field so that they may be more easily distinguished from each other.

As previously stated, a food portion containing two nutrients requires two cards, the one representing the calories, and indicated by the numeral 6, and the other representing the protein that the food portion contains, and indicated by the numeral 7. To give the calory cards 6 a distinctive characteristic and associate the same with the calory field the same are given the same color as said calory field. Likewise, the protein cards are given the same color as the protein field. Preferably the color of the field should be made in a color either a shade lighter or a shade darker than the corresponding cards 6 and 7 to make it more easy to distinguish the cards when putting them down on their respective fields.

Foods containing no protein, such as butter, sugar, fats and oils, are represented by one card, a calory card, indicated by the numeral 8 and are made distinctive from the other cards by giving them, for instance, an orange color, and as the food portions represented by these cards contain no protein, there will be no companion protein card for the protein field.

Some fruits and vegetables contain so little protein that a card to represent it would be too small for putting the necessary data thereon and the amount of protein is also so small that it is quite negligible in the ration. These fruits and vegetables are represented by cards 9 that are made distinctive from the other cards by giving the same a red color, as illustrated in the drawings. These cards 9 will also be associated with the calory field but there will be no companion protein cards. If desired, the quantity of protein contained in the fruit or vegetable portions may be indicated on the cards. It is, of course, understood that, in place of the colors given, other colors or other distinctive markings may be used to characterize the different fields and cards.

To make up a ration, select from the cards the ones bearing the names of the foods desired, place the yellow, orange and red cards on the yellow field, and the green cards on the green field, end to end, until said fields are substantially covered. Foods containing two kinds of nutrient are, as previously described, represented by two cards, to-wit: yellow for the calories and green for the protein. In selecting a yellow card, always look up the corresponding or companion green card for the same amount of food.

Indicated on each calory card, in addition to the name of the food it represents, is the price per pound, the weight and common measure the food portion represents and the cost thereof. On each protein card is indicated, in addition to the name of the food portion which it represents, the number of grams of protein and, when available, the amount of minerals in weight or measure. While in the drawings only enough cards are shown to represent a single ration, there will, as previously stated, be provided, with each contrivance, a number of other cards representing the nutrients in many kinds of foods and different portions thereof from which may be selected those representing the various different foods and portions thereof to make up any desired ration.

In place of having individual cards to represent different portions of the same food, a single card representing a large portion thereof may be provided and this card divided in sections to represent different portions of the total amount, as indicated by the lines Y on the calory and protein bread cards, as shown in Fig. 2. When such cards are used and it is desired to use a portion of the total amount, the adjacent card may be placed to overlap the portion not used and leave exposed only the portion of food the ration is to contain.

From the above description it is evident that by the use of the invention a balanced ration may be easily made up by an inexperienced person without having to do any calculating.

In addition to the above described use of the invention, the same may be used:

1. To compare the nutrients that can be bought in different foods for the same amount of money.

2. To compare the cost of foods that furnish equal amounts of nutrients.

3. To calculate the cost of rations. (If it is desired to reduce the cost of the ration, try out cards on the fields representing foods that contain the nutrients at less cost).

4. To show the nutrients in candy, cake, pie, nuts and other things looked upon more as relishes than a food.

5. To bring out the nutritive value of any food by comparing the nutrient with those contained in some standard food.

6. (a) To illustrate the nutritive needs of man as affected by age, sex or occupation. (b) To represent the nutritive needs of animals as affected by kinds of animals, age, size and purpose for which kept. (c) To illustrate and make up rations for reducing weight. (d) To illustrate and make up rations that provide the nutrients for increasing weight.

7. This contrivance can also be used for showing how long the nutrients from an acre or more, a certain number of acres or other units will feed a certain number of persons or animals, or how many men or animals can be fed for a given time.

8. The contrivance can also be used to make motion pictures to bring out the different points heretofore referred to or can be made in small size for individual use or large enough to use before an audience, or it can be made into lantern slides.

The above contrivance can also be used as a game. The problems can be for instance:
1. Make up the cheapest ration.
2. Make up a meatless ration.
3. Make up a wheatless ration.
4. Make up some other kind of ———less ration.
5. To compare the cost of foods that furnish the same amount of nutrients.
6. To compare the nutrients in foods that can be bought for equal amounts of money.

What I claim is:—

1. A ration balancing contrivance comprising two fields representing a predetermined required ration, one of said fields representing and having indicated thereon the aggregate number of required calories and the other thereof representing and having indicated thereon the aggregate required quantity of protein, and a number of cards representing the nutrients in different kinds of food, each of said cards having indicated thereon the kind of food it represents and the quantity thereof, the nutrients in predetermined quantities of certain kinds of food being represented by two cards, the one representing and having indicated thereon the number of calories represented thereby, and the other representing and having indicated thereon the quantity of protein represented thereby, the size of each card being in proportion to the proportionate number of calories or grams of protein represented thereby and the aggregate total of calories and grams of protein represented by certain selected cards must substantially equal the number of calories and grams of protein represented by their respective fields when the latter are substantially covered by their respective cards when placed end to end thereon.

2. A ration balancing contrivance comprising two fields, identified by different markings and representing a predetermined required ration, one of said fields representing and having indicated thereon the aggregate number of required calories and the other thereof representing and having indicated thereon the aggregate required quantity of protein, and a number of cards representing the nutrients in different kinds of food, each of said cards having indicated thereon the kind of food it represents and the quantity thereof, the nutrients in predetermined quantities of certain kinds of food being represented by two cards, the one representing calories with a marking identifying the same with the calory field and having indicated thereon the number of calories represented thereby and the other representing protein with a marking identifying the same with the protein field and having indicated thereon the quantity of protein represented thereby, the size of each card being in proportion to the proportionate number of calories or grams of protein represented thereby and the aggregate total of calories and grams of protein represented by certain selected cards must substantially equal the number of calories and grams of protein represented by their respective fields when the latter are substantially covered by their respective cards when placed end to end thereon.

3. A ration balancing contrivance comprising two fields representing a predetermined required ration, one of said fields representing and having indicated thereon the aggregate number of required calories and the other thereof representing and having indicated thereon the aggregate required quantity of protein, and a number of cards representing the nutrients in different kinds of food, each of said cards having indicated thereon the kind of food it represents and the quantity thereof, the nutrients in predetermined quantities of certain kinds of food being represented by two cards, the one representing and having indicated thereon the number of calories represented thereby, and the other representing and having indicated thereon the quantity of protein represented thereby, the size of each card being in proportion to the proportionate number of calories or grams of protein represented thereby and the aggregate total of calories represented by certain selected cards must substantially equal the number of calories represented by the calory field, when the latter is substantially covered by said cards when placed end to end thereon, certain of said selected calory cards having characteristics indicating corresponding protein cards to be placed upon the protein field, the aggregate total grams of protein represented by said protein cards must substantially equal the number of grams of protein represented by the protein field when the latter is substantially covered by said cards when placed side by side thereon.

4. A ration balancing contrivance comprising two fields, identified by different characteristics and representing a predetermined required ration, one of said fields representing and having indicated thereon the aggregate number of required calories and the other thereof representing and having indicated thereon the aggregate required quantity of protein, and a number of cards representing the nutrients in different kinds of food and quantity thereof, the nutrients in predetermined quantities of certain kinds of food being represented by two cards, the one representing and having indicated thereon the number of calories represented thereby and the other representing and having indicated thereon the quantity of protein represented thereby, the size of each card being in proportion to the proportionate number of calories or grams of protein represented thereby and the aggregate total of calories represented by certain selected cards must substantially equal the number of calories represented by the calory field, when the latter is substantially covered by said cards when placed end to end thereon, certain of said selected calory cards having characteristics indicating corresponding protein cards to be placed upon the protein field, the aggregate total grams of protein represented by said protein cards must substantially equal the number of grams of protein represented by the protein field when the latter is substantially covered by said cards when placed end to end thereon.

5. A ration balancing contrivance comprising two fields representing a predetermined required ration, one of said fields representing and having indicated thereon the aggregate number of required calories and the other thereof representing and having indicated thereon the aggregate required quantity of protein, and a number of cards representing the nutrients in different kinds of food, each of said cards having indicated thereon the kind of food it represents and the quantity thereof, the nutrients in predetermined quantities of certain kinds of food being represented by two cards, the one representing and having indicated thereon the number of calories represented thereby, and the other representing and having indicated thereon the quantity of protein represented thereby, certain other kinds of food containing no protein being represented by cards having a marking distinguishing the same from the other cards and identifying them with the calory field, the size of each card being in proportion to the proportionate number of calories or grams of protein represented thereby and the aggregate total of calories and grams of protein represented by certain selected cards must substantially equal the number of calories and grams of protein represented by their respective fields when the latter are substantially covered by their respective cards when placed end to end thereon.

6. A ration balancing contrivance comprising two fields representing a predetermined required ration, one of said fields representing and having indicated thereon the aggregate number of required calories and the other thereof representing and having indicated thereon the aggregate required quantity of protein, and a number of cards representing the nutrients in different kinds of food, each of said cards having indicated thereon the kind of food it represents and the quantity thereof, the nutrients in predetermined quantities of certain kinds of food being represented by two cards, the one representing and having indicated thereon the number of calories represented thereby, and the other representing and having indicated thereon the quantity of protein represented thereby, certain other kinds of food containing a negligible quantity of protein being represented by cards having a marking distinguishing the same from the other cards and identifying them with the calory field, the size of each card being in proportion to the proportionate number of calories or grams of protein represented thereby and the aggregate total of calories and grams of protein represented by certain selected cards must substantially equal the number of calories and grams of protein represented by their respective fields when the latter are substantially covered by their respective cards when placed end to end thereon.

7. A ration balancing contrivance comprising two fields representing a predetermined required ration, one of said fields representing and having indicated thereon the aggregate number of required calories and the other thereof representing and having indicated thereon the aggregate required quantity of protein, and a number of cards representing the nutrients in different kinds of food, each of said cards having indicated thereon the kind of food it represents, and the quantity and cost thereof, the nutrients in predetermined quantities of certain kinds of food being represented by two cards, the one representing and having indicated thereon the number of calories represented thereby, and the other representing and having indicated thereon the quantity of protein represented thereby, the size of each card being in proportion to the proportionate number of calories or grams of protein represented thereby and the aggregate total of calories and grams of protein represented by certain selected cards must substantially equal the number of calories and grams of protein represented by their respective fields when the latter are substantially covered by their respective cards when placed end to end thereon.

In testimony whereof I affix my signature in presence of two witnesses.

WILLIAM C. PALMER.

Witnesses:
ZACH F. WICKMAN,
HARRY P. ANDERSON.

Copies of this patent may be obtained for five cents each, by addressing the "Commissioner of Patents, Washington, D. C."